United States Patent
Song et al.

(10) Patent No.: US 11,726,369 B2
(45) Date of Patent: Aug. 15, 2023

(54) SUBSTRATE

(71) Applicant: LG Chern, Ltd., Seoul (KR)

(72) Inventors: Cheol Ock Song, Daejeon (KR); Han Min Seo, Daejeon (KR); Nam Seok Bae, Daejeon (KR); Jae Sung Han, Daejeon (KR); Seung Heon Lee, Daejeon (KR)

(73) Assignee: LG Chem, Ltd.

( * ) Notice: Subject to any disclaimer, the term of this patent is extended or adjusted under 35 U.S.C. 154(b) by 243 days.

(21) Appl. No.: 17/269,110

(22) PCT Filed: Nov. 18, 2019

(86) PCT No.: PCT/KR2019/015720
§ 371 (c)(1),
(2) Date: Feb. 17, 2021

(87) PCT Pub. No.: WO2020/105977
PCT Pub. Date: May 28, 2020

(65) Prior Publication Data
US 2021/0311343 A1    Oct. 7, 2021

(30) Foreign Application Priority Data

Nov. 19, 2018  (KR) .................. 10-2018-0142971

(51) Int. Cl.
*G02F 1/1339*    (2006.01)
(52) U.S. Cl.
CPC ...... *G02F 1/13394* (2013.01); *G02F 1/13398* (2021.01)

(58) Field of Classification Search
None
See application file for complete search history.

(56) References Cited

U.S. PATENT DOCUMENTS

| | | |
|---|---|---|
| 2003/0223216 A1 | 12/2003 | Emmons et al. |
| 2008/0003380 A1 | 1/2008 | Kim et al. |
| 2008/0218679 A1* | 9/2008 | Hong ............... G02F 1/1339 349/187 |
| 2009/0086151 A1 | 4/2009 | Seo et al. |
| 2011/0068334 A1* | 3/2011 | Yamazaki ............ B82Y 30/00 257/43 |

(Continued)

FOREIGN PATENT DOCUMENTS

| | | |
|---|---|---|
| EP | 0022311 A1 | 1/1981 |
| JP | 2000155321 A | 6/2000 |

(Continued)

OTHER PUBLICATIONS

Extended European Search Report for EP Application No. 19886274 dated Dec. 15, 2021, 2 pgs.

(Continued)

*Primary Examiner* — Angela K Davison
(74) *Attorney, Agent, or Firm* — Lerner David LLP

(57) ABSTRACT

A substrate, an optical device include the same, and a method of making the same are disclosed herein. In some embodiments, a substrate includes a base layer, a plurality of column spacers disposed on the base layer, and a ball spacer attached to or embedded in at least one of the plurality of column spacers. The spacers having excellent dimensional accuracy and adhesiveness on the substrate.

17 Claims, 20 Drawing Sheets

(56) References Cited

U.S. PATENT DOCUMENTS

| | | | |
|---|---|---|---|
| 2015/0108672 A1* | 4/2015 | Zhao | B29C 37/005 |
| | | | 425/140 |
| 2017/0090232 A1* | 3/2017 | Tang | G02F 1/133512 |
| 2017/0261796 A1 | 9/2017 | Tamaki | |
| 2019/0018273 A1* | 1/2019 | Park | C09B 29/3673 |

FOREIGN PATENT DOCUMENTS

| | | | |
|---|---|---|---|
| JP | 2005140993 A | 6/2005 | |
| JP | 2005265926 A | 9/2005 | |
| JP | 2005266754 A | 9/2005 | |
| JP | 2005529361 A | 9/2005 | |
| JP | 2007250620 A | 9/2007 | |
| JP | 5910788 B1 | 4/2016 | |
| JP | 2017033023 A | 2/2017 | |
| JP | 2017161853 A | 9/2017 | |
| JP | 6225566 B2 | 11/2017 | |
| KR | 20060070928 A | 6/2006 | |
| KR | 20060108836 A | 10/2006 | |
| KR | 20080081426 A | 9/2008 | |
| KR | 20100066197 A | 6/2010 | |
| KR | 101299693 B1 | 8/2013 | |
| KR | 20140123137 A | 10/2014 | |
| WO | 03104884 A2 | 12/2003 | |

OTHER PUBLICATIONS

Search Report for International Application No. PCT/KR2019/015720, dated Feb. 27, 2020, 2 pages.

* cited by examiner

SUBSTRATE

CROSS-REFERENCE TO RELATED APPLICATION(S)

This application is a national phase entry under 35 U.S.C. § 371 of International Application No. PCT/KR2019/015720, filed on Nov. 18, 2019, which claims priority based on Korean Patent Application No. 10-2018-0142971, filed on Nov. 19, 2018, the disclosures of which are incorporated by reference herein.

TECHNICAL FIELD

The present application relates to a substrate.

BACKGROUND ART

An optical device capable of adjusting light transmittance or colors or reflectance, and the like by disposing a light modulating material such as a liquid crystal compound or a mixture of a liquid crystal compound and a dye between substrates disposed opposite to each other is known. For example, Patent Document 1 discloses a so-called GH cell (guest host cell) applying a mixture of a liquid crystal host and a dichroic dye guest.

In such a device, so-called spacers are located between the substrates to maintain the spacing between the substrates.

As the spacer, a so-called ball spacer and a column spacer have been typically used. The column spacer is a form fixed on a substrate, which has been generally formed by exposing and developing a photosensitive resin.

Patent Document 1: European Patent Publication No. 0022311

DISCLOSURE

Technical Problem

Figure 1:
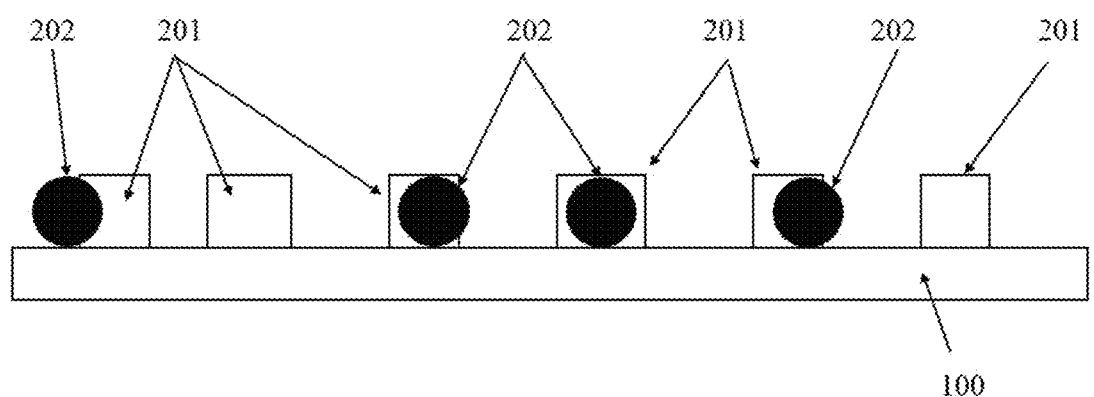
FIGS. 1 and 2 are schematic diagrams in a form of the substrate of the present application.

The present application provides a substrate. It is one object of the present application to provide a substrate that a column spacer is formed on a surface of a base layer, wherein the column spacer is attached to the base layer with excellent sticking force and the height and diameter of the column spacer are uniformly controlled, and a method for manufacturing the same.

Technical Solution

Among physical properties mentioned in this specification, when the measured temperature affects the results, the relevant physical properties are physical properties measured at room temperature, unless otherwise specified. The term room temperature is a natural temperature without being heated or cooled, which may be, for example, any temperature in a range of 10° C. to 30° C., or about 23° C. or about 25° C. or so. In addition, unless otherwise specified herein, the unit of temperature is ° C.

Among physical properties mentioned in this specification, when the measured pressure affects the results, the relevant physical properties are physical properties measured at normal pressure, unless otherwise specified. The term normal pressure is a natural pressure without being pressurized or depressurized, where usually about 1 atm is referred to as the normal pressure.

The substrate of the present application comprises a base layer and a spacer present on the base layer.

As the base layer, for example, any base layer used in a substrate in a configuration of a known optical device such as an LCD (liquid crystal display) can be applied without particular limitation. For example, the base layer may be an inorganic base layer or an organic base layer. As the inorganic base layer, a glass base layer or the like can be exemplified, and as the organic base layer, various plastic films or the like can be exemplified. The plastic film can be exemplified by a TAC (triacetyl cellulose) film; a COP (cycloolefin copolymer) film such as a norbornene derivative; an acrylic film such as PMMA (poly(methyl methacrylate); a PC (polycarbonate) film; a polyolefin film such as PE (polyethylene) or PP (polypropylene); a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethyleneterephtalate) film; a PI (polyimide) film; a PSF (polysulfone) film or a PAR (polyarylate) film, and the like, but is not limited thereto.

In the substrate of the present application, the thickness of the base layer is also not particularly limited, where an appropriate range may be selected depending on applications.

A plurality of spacers is present on the base layer. The spacer may be a column spacer. The column spacer has the same meaning as known in the art, and for example, the column spacer may be a spacer fixed to the base layer in a columnar shape. Here, the fact that the spacer is fixed to the base layer comprises a case where the spacer is fixed in direct contact with the base layer or a case where if other layer exists between the base layer and the spacer, the spacer is fixed on the relevant other layer. Here, the kind of the other layer includes a known layer necessary for driving the optical device and, for example, an electrode layer, and the like, which is described below, can be exemplified.

For example, the substrate may have a structure in which an electrode layer is further present between the base layer and the column spacer, and the spacer is in contact with the electrode layer.

The columnar shape of the column spacer is not particularly limited, and for example, an elliptical columnar shape, a cylindrical shape, a square columnar shape, a triangular columnar shape, other polygonal columnar shapes and irregular columnar shapes are included.

The column spacer of the present application is formed in a specific manner to be described below, which has a specific form, excellent dimensional uniformity and excellent adhesiveness with the base layer.

That is, in one example, in the substrate, a plurality of column spacers is present on the base layer, where so-called ball spacers are attached to and/or embedded in at least some column spacers. Here, the ball spacer is a circular spacer of a conventional meaning known in the art. The ball spacers attached to the column spacer may be attached to the column spacer in a state where some are inserted into the column spacer.

In addition, the embedded ball spacer in the column spacer may be completely embedded in the column spacer, or may also have a form that at least a part is embedded similarly to the attachment.

Figure 2:
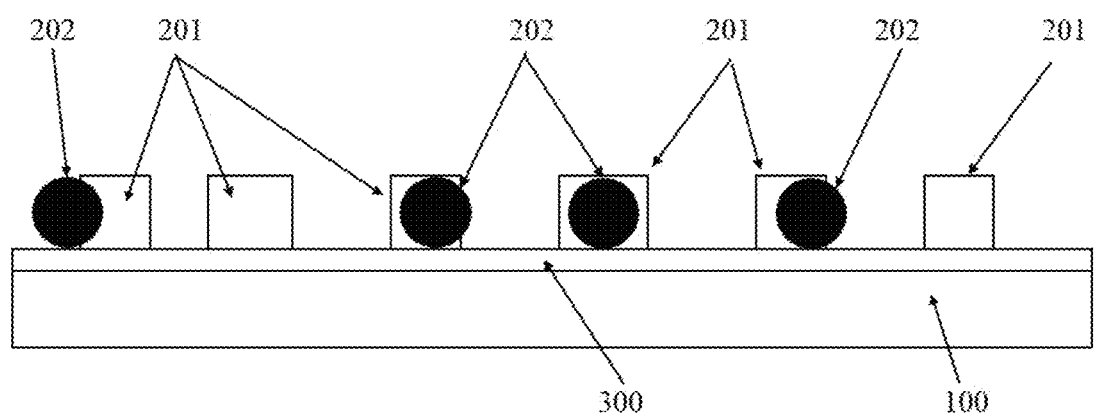

FIG. 1 is a lateral schematic diagram of a substrate comprising a plurality of column spacers (201) formed on a base layer (100), which is a form that ball spacers (202) are attached to or embedded in at least some of the column spacers (201) in the present application as shown in the drawing. The ball spacer may be a black ball spacer. The substrate in such a form may be manufactured in a manner to be described below, whereby a column spacer having excellent dimensional uniformity and adhesiveness to the base layer may be formed. FIG. 1 shows the form that spacers (201, 202) are formed directly on the base layer (100), but as shown in FIG. 2, other layer (300) such as an electrode layer is further present between the base layer (100) and the spacers (201, 202), where the spacers (201, 202) may also be in contact with the other layer (300).

In the substrate of the structure, the ratio (A/B) of the number (A) of column spacers to which the ball spacers are attached and/or embedded to the number (B) of column spacers to which the ball spacers are not attached and embedded may be in a range of 0.01 to 10. In another example, the ratio may be about 0.05 or more, about 0.1 or more, about 0.15 or more, about 0.2 or more, about 0.21 or more, about 0.22 or more, or about 0.23 or more, or may also be about 9 or less, about 8 or less, about 7 or less, about 6 or less, about 5 or less, about 4 or less, about 3 or less, about 2 or less, about 1.9 or less, about 1.8 or less, about 1.7 or less, or about 1.6 or less or so. Within such a range, a column spacer showing the desired dimensional uniformity, adhesiveness, aperture ratios, and the like can be produced, and this ratio can be controlled by adjusting a ratio of a binder and ball spacers in a curable composition in a production process to be described below.

Such a column spacer may have an appropriate range of dimensions depending on the purpose, where the range is not particularly limited.

For example, an average value of heights of the plurality of column spacers may be in a range of about 2 µm to 50 µm. In another example, the average value may be 3 µm or more or so, 4 µm or more or so, 5 µm or more or so, 6 µm or more or so, 7 µm or more or so, 8 µm or more or so, 9 µm or more or so, 10 µm or more or so, 11 µm or more or so, or 12 µm or more or so, or may also be 45 µm or less or so, 40 µm or less or so, 35 µm or less or so, 30 µm or less or so, 25 µm or less or so, 20 µm or less or so, 19 µm or less or so, 18 µm or less or so, 17 µm or less or so, 16 µm or less or so, 15 µm or less or so, 14 µm or less or so, or 13 µm or less or so.

An average value of diameters of the plurality of column spacers may be in a range of 4 µm to 60 µm. In another example, the average value may be 6 µm or more or so, 8 µm or more or so, 10 µm or more or so, 12 µm or more or so, 14 µm or more or so, 16 µm or more or so, 18 µm or more or so, 20 µm or more or so, 22 µm or more or so, or 24 µm or more or so, or may also be 58 µm or less or so, 56 µm or less or so, 54 µm or less or so, 52 µm or less or so, 50 µm or less or so, 48 µm or less or so, or 46 µm or less or so.

Here, the diameter of the column spacer may be the length of the major axis or minor axis when the cross section of the column spacer is elliptical, the diameter when it is circular, or the largest dimension or the smallest dimension or the average value of the measured dimensions when it is a polygonal or irregular shape.

Such column spacers may have good dimensional uniformity. For example, the standard deviation of the heights of the plurality of column spacers may be in a range of 0.05 µm to 0.3 µm. In the standard deviation mentioned in this specification, the standard deviation is a numerical value determined by a positive square root of variance. In another example, the standard deviation may be 0.06 µm or more or so, 0.07 µm or more or so, 0.08 µm or more or so, 0.09 µm or more or so, 0.1 µm or more or so, or 0.11 µm or more or so, or may also be 0.29 µm or less or so, 0.28 µm or less or so, 0.27 µm or less or so, 0.26 µm or less or so, 0.25 µm or less or so, 0.24 µm or less or so, 0.23 µm or less or so, 0.22 µm or less or so, 0.21 µm or less or so, 0.2 µm or less or so. The standard deviation of the diameters of the plurality of column spacers may be in a range of 0.3 µm to 1.5 µm. In another example, the standard deviation may be 0.31 µm or more or so, 0.32 µm or more or so, 0.33 µm or more or so, 0.34 µm or more or so, 0.35 µm or more or so, 0.36 µm or more or so, 0.37 µm or more or so, 0.38 µm or more or so, 0.39 µm or more or so, 0.4 µm or more or so, 0.41 µm or more or so, 0.42 µm or more or so, 0.43 µm or more or so, 0.44 µm or more or so, 0.45 µm or more or so, or 0.46 µm or more or so, or may also be 1.4 µm or less or so, 1.3 µm or less or so, 1.2 µm or less or so, 1.1 µm or less or so, 1 µm or less or so, or 0.9 µm or less or so. The standard deviation is a numerical value determined by a positive square root of variance.

Such column spacers may be produced by, for example, applying a conventional binder used for manufacturing column spacers and the like. Usually, the column spacers are produced by pattern-exposing the binder that an ultraviolet curable compound is mixed with an initiator and the like which initiate curing of the compound as a photosensitive binder. In the present application, such materials may also be applied. In this case, the cured product of the ultraviolet curable compound may form the column spacers. The specific kind of the ultraviolet curable compound is not particularly limited, and for example, polymer materials of acrylate series or polymers of epoxy series, and the like may be used, without being limited thereto. Various kinds of binders are known in the art, which can manufacture column spacers.

Among the spacers applied to the substrate of the present application, the type of the ball spacer is not particularly limited, and an appropriate kind may be selected from known ball spacers and used. In one example, as the ball spacer, one having a dimensional relationship with the column spacer in a predetermined range may be applied in consideration of the desired dimensional accuracy, adhesion and/or aperture ratios, and the like.

For example, as the ball spacers, those having a ratio (H/D) of a height average value (H) of the column spacers to an average particle diameter (D) of the ball spacers of more than 1 can be used. In another example, the ratio (H/D) may be 1.2 or less or so, 1.1 or less or so, 1.09 or less or so, 1.08 or less or so, 1.07 or less or so, 1.06 or less or so, 1.05 or less or so, 1.04 or less or so, 1.03 or less or so, 1.02 or less or so, or 1.01 or less or so. Although the upper limit of the ratio (H/D) is not particularly limited, there is an effect capable of more stably maintaining a cell gap within the above-described range.

For example, as the ball spacers, those having a ratio (T/D) of a diameter average value (T) of the column spacers to an average particle diameter (D) of the ball spacers of more than 1 can be used. In another example, the ratio (T/D) may be 1.2 or more or so, 1.4 or more or so, 1.6 or more or so, 1.8 or more or so, 2 or more or so, 2.2 or more or so, 2.4 or more or so, or 2.6 or more or so, or may also be 5 or less or so, 4.8 or less or so, 4.6 or less or so, 4.4 or less or so, 4.2 or less or so, 4 or less or so, 3.8 or less or so, 3.6 or less or so, 3.4 or less or so, 3.2 or less or so, 3 or less or so, 2.8 or less or so, 2.6 or less or so, 2.4 or less or so, or 2.2 or less or so. Under this upper limit range, the pattern appearance of the spacers can be better maintained.

The desired spacers can be formed effectively by applying the ball spacers in the above range in consideration of target dimensions of the column spacers and performing a manufacturing method to be described below.

The specific average particle diameter range of the ball spacers is not particularly limited, and they may have an average particle diameter in a range to satisfy the ratio range according to the dimension of the column spacers.

The plurality of ball spacers included in the substrate may have a particle diameter standard deviation of 0.8 μm or less. In another example, the standard deviation may be 0.7 μm or less or so, 0.6 μm or less or so, or 0.5 μm or less or so, or may be 0 μm or more or so, more than 0 μm or so, 0.1 μm or more or so, 0.2 μm or more or so, 0.3 μm or more or so, or 0.4 μm or more or so. By applying such ball spacers, spacers of the desired shape can be effectively formed.

The plurality of ball spacers included in the substrate may have a particle diameter CV (coefficient of variation) value of approximately 8% or less or so. The CV value is a value defined by 100×standard deviation of ball spacer particle diameters/average particle diameter of ball spacers. In another example, this CV value may be approximately 7% or less or so, 6% or less or so, or 5% or less or so, or may be 0% or more or so, more than 0% or so, 1% or more or so, 2% or more or so, 3% or more or so, or 4% or more or so. By applying such ball spacers, spacers of the desired shape can be effectively formed.

The area occupied by the spacers (ball spacers and column spacers) on the base layer is not particularly limited, which may be selected in consideration of the desired applications of the substrate and the like. For example, the ratio of the areas of the spacers (ball spacers and column spacers) present on the surface of the base layer may be in a range of approximately 0.5% to 20% based on the total area of the surface of the base layer.

The column spacer may be a black spacer. For example, the column spacer may be a black column spacer, and in this case, the applied ball spacer may also be a black ball spacer. The black ball spacers are variously known, and all of these known ball spacers can be applied in the present application. As the black ball spacer, for example, a spacer in which the entire ball spacer is black or a black ball spacer coated with black on the outside of the ball, and the like is known, where carbon black or a carbon-based material such as CNT (carbon nanotube) or graphene, or various well-known dyes or pigments, and the like are applied as the coating material. Usually, in the case of black spacers, it is difficult to secure the dimensional accuracy by darkening materials included in the spacers during the formation process and it is not easy to secure the adhesiveness to the base layer, but in the present application, spacers having excellent dimensional accuracy and adhesiveness can be formed. In the present application, the term black spacer may mean a spacer whose optical density is measured in a range of 1.1 to 4. The optical density can be obtained by measuring the transmittance (unit: %) for the black spacer or the transmittance (unit: %) of a layer including the same components as those of the spacer, and then substituting it into the equation of the optical density (optical density=$-\log_{10}$ (T), T: the transmittance). Here, the layer including the same components as those of the black spacer may be formed by a method, such as coating, vapor deposition or plating. At this time, the thickness of the formed layer may be the same as the height of the black spacer, or may be about 12 μm or so. For example, in the category of the black spacer, the case where the optical density of the layer with a thickness of about 12 μm or so formed of the same components as those of the spacer is in the above-mentioned range, the optical density of the actual black spacer is in the above range, or the numerical value that the optical density of the layer with a thickness of about 12 μm or so is converted in consideration of the thickness of the actual black spacer is in the above range can be included. Such an optical density can be obtained, for example, according to a method of evaluating optical densities of the spacers of the following examples. In another example, such an optical density may be about 3.8 or less, about 3.6 or less, about 3.4 or less, about 3.2 or less, about 3 or less, about 2.8 or less, about 2.6 or less, about 2.4 or less, about 2.2 or less, or about 2 or less, or may be 1.2 or more, 1.4 or more, or 1.6 or more.

In an optical device that can adjust light transmittance, colors and/or reflectance, the region in which the spacers exist is an optically inactive region, but the present application can prevent occurrence of light leakage or the like upon driving the device and ensure uniform optical performance through the application of the black spacer with the above-mentioned optical density.

For example, such a black spacer can be manufactured by usually adding a component (darkening material) capable of implementing black to a material (for example, the above-described binder or the like) for manufacturing the column spacer.

Accordingly, the column spacer or the ball spacer may comprise a pigment or a dye capable of darkening, and the like, and specifically, a metal oxide, a metal nitride, a metal oxynitride, carbon black, graphite, an azo-based pigment, a phthalocyanine pigment or a carbon-based material, and the like. As the metal oxide which can be applied in the above, chromium oxide ($Cr_xO_y$, etc.) or copper oxide ($Cu_xO_y$, etc.), and the like can be exemplified and as the metal oxynitride, aluminum oxynitride ($Al_xO_yN_z$, etc.) can be exemplified, without being limited thereto. In addition, as the carbon-based material, porous carbon such as carbon nanotube (CNT), graphene and activated carbon can be exemplified, without being limited thereto.

For example, the black spacer can be manufactured by combining the material (e.g., carbon-based material) to the above-described binder and then curing them, or applying the material itself to deposition or plating and the like in an appropriate manner.

The types of pigments or dyes, and the like that can be used in the present application are not limited to the above, and appropriate types may be selected depending on the desired darkening (optical density) and the like, and the ratios in the spacer may also be selected in consideration of the darkening and the like.

The plurality of column spacers may be regularly arranged or irregularly arranged on the base layer. Specifically, the plurality of spacers on the base layer may be regularly arranged such that the pitches between each other are substantially the same, or may be irregularly arranged such that at least some of the pluralities of column spacers have different pitches from each other.

Here, when a part of the plurality of spacers have been selected so as to form a closed figure in a state where other spacers are not present therein, the term pitch can be defined as a length of a side of the closed figure. In addition, unless otherwise specified, the unit of the pitch is µm.

The closed figure thus formed may be a triangle, a quadrangle or a hexagon. That is, when three spacers among the plurality of spacers have been optionally selected and connected to each other, the triangle is formed; when four spacers have been selected and connected to each other, the quadrangle is formed; and when six spacers have been selected and connected, the hexagon is formed.

In one example, the length (pitch) of the side of the closed figure may be up to about 600 µm or so. In another example, the maximum length of the side lengths of the closed figure may be about 550 µm or less, about 500 µm or less, about 450 µm or less, about 400 µm or less, about 350 µm or less, or about 300 µm or less, or may be about 50 µm or more, or about 100 µm or more.

In regular arrangements, the lengths (pitches) of the sides of the closed figure are substantially the same from each other. On the other hand, in the case of irregular arrangements, the minimum length of the side lengths of the closed figure may be about 10 µm or more. In another example, the minimum length of the side lengths of the closed figure may be about 100 µm or less, about 90 µm or less, about 80 µm or less, 70 µm or less, or about 65 µm or less, or may be about 20 µm or more, 30 µm or more, or 40 µm or more.

The closed figure thus formed may be a triangle, a quadrangle or a hexagon. That is, when three spacers among the plurality of spacers have been optionally selected and connected to each other, the triangle is formed; when four spacers have been selected and connected to each other, the quadrangle is formed; and when six spacers have been selected and connected, the hexagon is formed.

When the arrangement of the spacers is regular, the lengths of the respective sides of the triangle, quadrangle or hexagon, which is the closed figure, are substantially the same, and in the case of the irregular arrangement, at least one side length differs.

Figure 3:
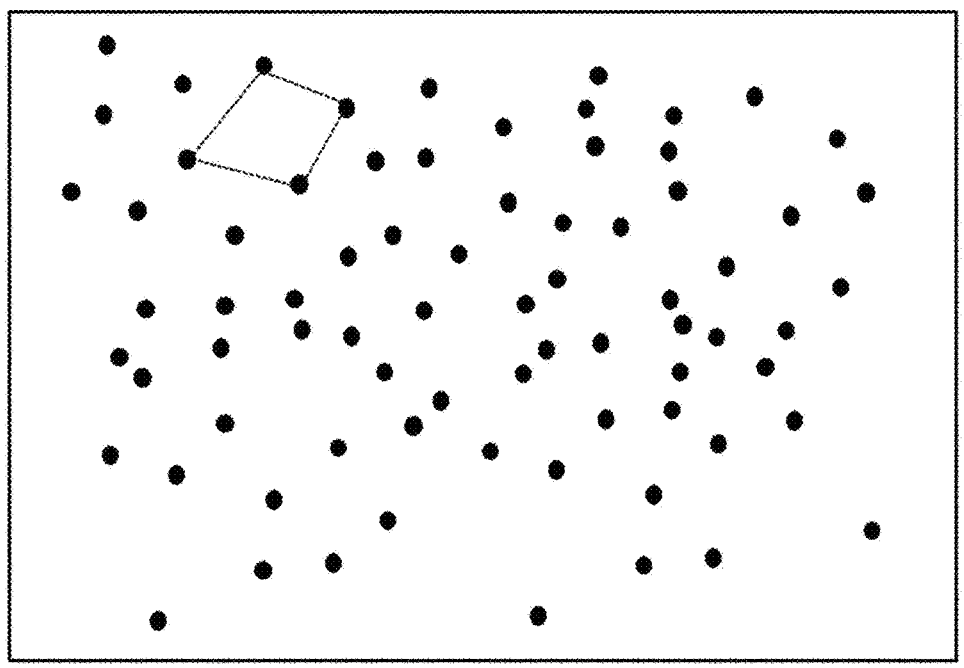
FIGS. 3 to 7 are diagrams for explaining arrangement forms of spacers in the substrate of the present application.
Figure 4:
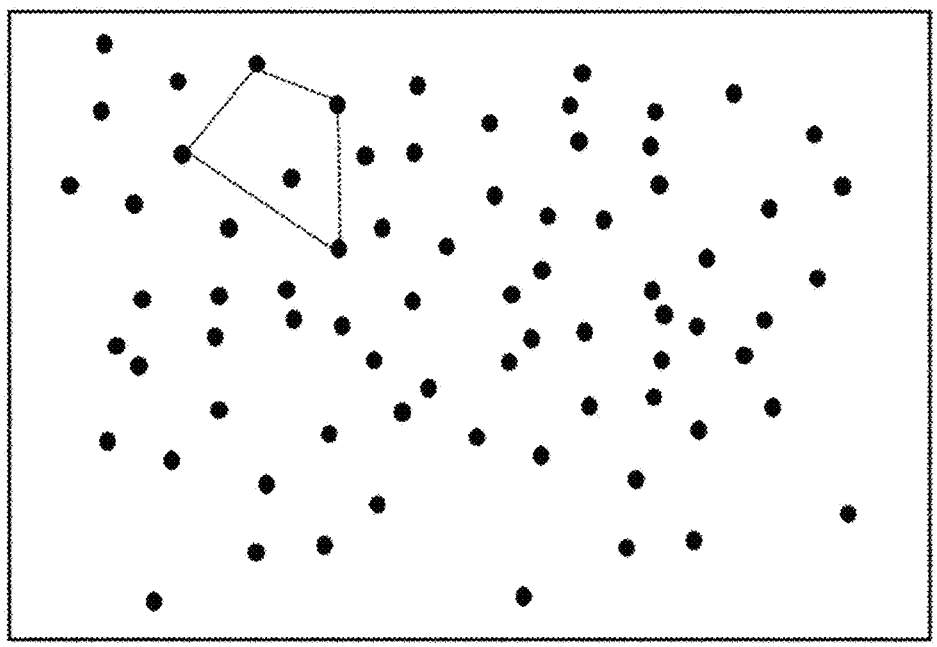

Hereinafter, the case where the arrangement of the spacers is irregular will be described. When spacers (black dots) present on the base layer are irregularly arranged, FIG. 3 is an example of a quadrangle, which is a closed figure formed by optionally selecting four spacers among the spacers and connecting them with a virtual line (dotted line). However, the closed figure formed at the time of determining the pitch is formed such that no spacer is present therein. Therefore, for example, the case where the spacers are formed such that other spacers exist therein as shown in FIG. 4 is excluded at the time of determining the pitch.

In one example, the ratio (%) of the number of sides having the same length among sides of a triangle, a quadrangle or a hexagon, which is the closed figure thus formed (100×(number of sides of the same length)/3 in the case of a triangle, 100×(number of sides of the same length)/4 in the case of a quadrangle, and 100×(number of sides of the same length)/6 in the case of a hexagon) can be 85% or less. In another example, the ratio may be 84% or less, 80% or less, 76% or less, 67% or less, 55% or less, or 40% or less. The lower limit of the ratio is not particularly limited. That is, in some cases, since the lengths of all sides of the closed figure may not be the same, the lower limit of the ratio may be 0%.

In the case where the spacers are irregularly arranged as described above, the arrangement density of the spacers may be substantially close between certain regions.

For example, if the normal pitch of the plurality of irregularly arranged spacers is P, when two or more square regions with 10P as a length of one side have been optionally selected on the surface of the base layer, the standard deviation of the number of spacers present in each square region may be 2 or less.

Figure 5:
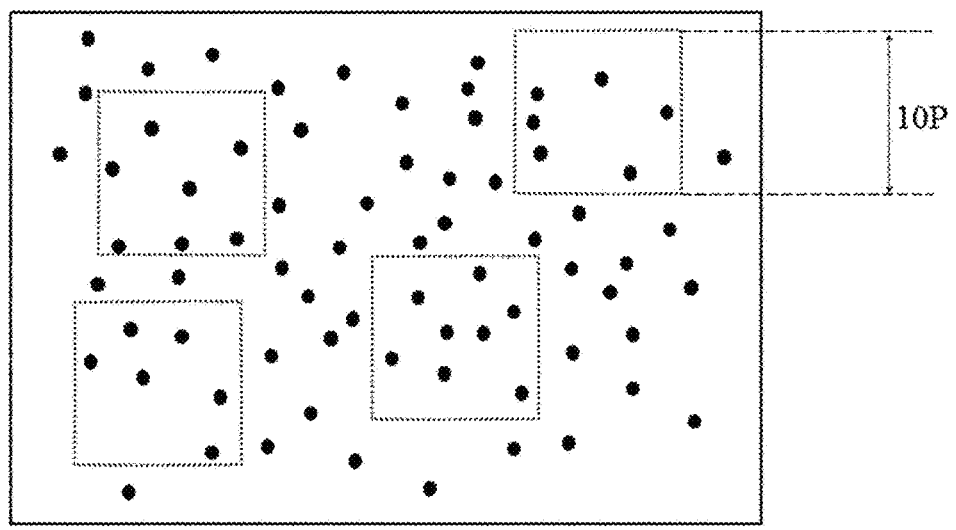

FIG. 5 is a diagram illustratively showing a case where four square regions (dotted rectangular regions of FIG. 5) with 10P as a length of one side have been optionally selected. Here, the term normal pitch means a distance between the centers of adjacent spacers in a state where the plurality of spacers, in actuality, irregularly disposed on the base layer are placed so that all of the spacers are virtually disposed at the same pitch in consideration of the number of the spacers and the area of the base layer. This normal pitch may be the pitch of spacers arranged regularly.

The manner to confirm a virtual state where all of the above-mentioned spacers are disposed so as to have the same pitch is known, which can be achieved by using a random number generating program such as, for example, CAD, MATLAB, STELLA or Excel. The standard deviation is a numerical value representing a degree of scattering of the number of the spacers, which is a numerical value determined by a positive square root of dispersion.

When at least two or more of the rectangular regions have been optionally designated on the surface of the base layer that spacers are formed thereon and then the standard deviation of the numbers of spacers existing in the regions has been obtained, the standard deviation may be 2 or less. In another example, the standard deviation may be 1.5 or less, 1 or less, or 0.5 or less. In addition, the lower limit of the standard deviation is not particularly limited, which may be 0, for example.

Here, the number of the designated rectangular regions is not particularly limited as long as it is 2 or more, but in one example, it may be selected as the number that the rectangular regions are optionally selected so as not to overlap each other on the surface of the base layer, provided that the area occupied by the optionally selected regions is about 10% or more, 20% or more, 30% or more, 40% or more, 50% or more, 60% or more, 70% or more, 80% or more, or 90% or more of the total area of the base layer. The range of the normal pitch (P) forming one side of the arbitrary rectangular region can be determined by the number of spacers present on the base layer and the area of the relevant base layer, as described above, which is not particularly limited, and usually, it may be in a range of 50 µm to 1,000 µm. In another example, the normal pitch (P) may be about 60 µm or more, 70 µm or more, 80 µm or more, 90 µm or more, 100 µm or more, or 110 µm or more, and may also be about 900 µm or less, 800 µm or less, 700 µm or less, 600 µm or less, 500 µm or less, 400 µm or less, 300 µm or less, 200 µm or less, or 150 µm or less.

The average number of spacers present in optionally selected square regions as above may be, for example, about 80 to 150 or so. In another example, the average number may be 82 or more, 84 or more, 86 or more, 88 or more, 90 or more, 92 or more, 94 or more, 96 or more, or 98 or more. Also, in another example, the average number may be 148 or less, 146 or less, 144 or less, 142 or less, 140 or less, 138 or less, 136 or less, 134 or less, 132 or less, 130 or less, 128 or less, 126 or less, 124 or less, 122 or less, 120 or less, 118 or less, 116 or less, 114 or less, or 112 or less.

The ratio (SD/A) of the average number (A) of the spacers and the above-mentioned standard deviation (SD) may be 0.1 or less. In another example, the ratio may be 0.09 or less, 0.08 or less, 0.07 or less, 0.06 or less, 0.05 or less, 0.04 or less, 0.03 or less, 0.02 or less, or 0.01 or less. In addition, the ratio (SD/A) may also be 0 or more, or about 0.005 or more or so.

The average number (A) or the ratio (SD/A) may be optionally changed, and for example, the numerical value may be changed in consideration of the transmittance, the cell gap and/or the uniformity of the cell gap required in the device to which the substrate is applied, and the like.

Here, the entire density of the plurality of spacers can be adjusted so that the ratio of the area occupied by the spacers is about 50% or less relative to the total area of the base layer. In another example, the ratio may be about 45% or less, about 40% or less, about 35% or less, about 30% or less, about 25% or less, about 20% or less, about 15% or less, about 10% or less, about 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, or 1.5% or less. In another example, the ratio may be about 0.1% or more, 0.2% or more, 0.3% or more, 0.4% or more, 0.5% or more, 0.6% or more, 0.7% or more, 0.8% or more, 0.9% or more, or 0.95% or more.

The respective numerical values may be changed, if necessary, and for example, the numerical values may be changed in consideration of the transmittance, the cell gap and/or the uniformity of the cell gap required in the device to which the substrate is applied, and the like.

The plurality of spacers may be arranged such that their spacing normal distribution diagram represents a predetermined shape.

Here, the spacing normal distribution diagram is a distribution diagram showing the pitch between the spacers as the X-axis and the ratio of the spacers having the relevant pitch among all the spacers as the Y-axis, where the ratio of the spacers is a ratio obtained when the number of the entire spacer has been assumed to be 1.

Figure 6:
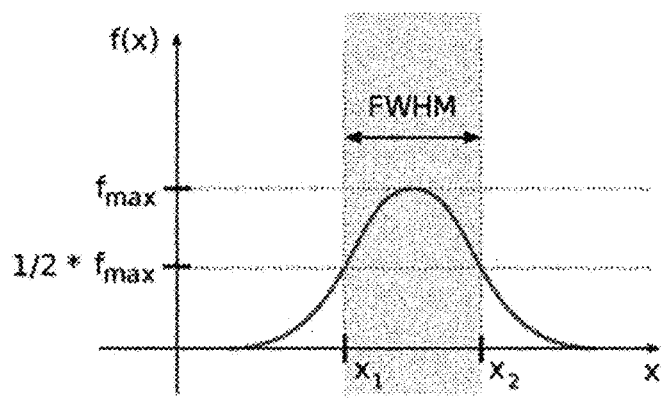

An example of such a distribution diagram is shown in FIG. 6. In addition, in this specification, the pitch in the description related to the spacing normal distribution diagram is a length of sides in a triangle, a quadrangle or a hexagon, which is the above-mentioned closed figure.

The distribution diagram can be obtained using a known random number coordinate program, for example, a CAD, MATLAB or STELLA random number coordinate program or the like.

In one example, the plurality of spacers may be disposed such that a half height area in the distribution diagram is in a range of 0.4 to 0.95. In another example, the half height area may be 0.45 or more, 0.5 or more, 0.55 or more, 0.6 or more, 0.65 or more, 0.7 or more, or 0.85 or more. Also, in another example, the half height area may be 0.9 or less, 0.85 or less, 0.8 or less, 0.75 or less, 0.7 or less, 0.65 or less, 0.6 or less, 0.55 or less, or 0.5 or less.

The plurality of spacers may be arranged such that a ratio (FWHM/Pm) of the half height width (FWHM) to the average pitch (Pm) in the distribution diagram is 1 or less. In another example, the ratio (FWHM/Pm) may be 0.05 or more, 0.1 or more, 0.11 or more, 0.12 or more, or 0.13 or more. Also, in another example, the ratio (FWHM/Pm) is about 0.95 or less, about 0.9 or less, about 0.85 or less, about 0.8 or less, about 0.75 or less, about 0.7 or less, about 0.65 or less, about 0.6 or less, about 0.55 or less, about 0.5 or less, about 0.45 or less, or about 0.4 or less.

When at least 80% or more, 85% or more, 90% or more, or 95% or more of spacers have been selected to form a triangle, quadrangle or hexagon, which is the above-described closed figure, the above-mentioned average pitch (Pm) is an average of the lengths of the respective sides of the triangle, quadrangle or hexagon formed by the selected spacers. Here, the spacers are also selected so that the formed triangles, quadrangles or hexagons do not share vertexes with respect to each other.

The plurality of spacers may be disposed such that the half height width (FWHM) in the distribution diagram is in a range of 0.5 μm to 1,000 μm. In another example, the half height width (FWHM) may be about 1 μm or more, 2 μm or more, 3 μm or more, 4 μm or more, 5 μm or more, 6 μm or more, 7 μm or more, 8 μm or more, 9 μm or more, 10 μm or more, 11 μm or more, 12 μm or more, 13 μm or more, 14 μm or more, 15 μm or more, 16 μm or more, 17 μm or more, 18 μm or more, 19 μm or more, 20 μm or more, 21 μm or more, 22 μm or more, 23 μm or more or 24 μm or more, 27 μm or more, 30 μm or more, 35 μm or more, 40 μm or more, 45 μm or more, or 50 μm or more. In another example, the half height width (FWHM) may be about 900 μm or less, 800 μm or less, 700 μm or less, 600 μm or less, 500 μm or less, 400 μm or less, 300 μm or less, 200 μm or less, 150 μm or less, 100 μm or less, 90 μm or less, 80 μm or less, 70 μm or less, 60 μm or less, 50 μm or less, 40 μm or less, or 30 μm or less.

The plurality of spacers may be disposed such that the maximum height (Fmax) of the spacing normal distribution diagram is 0.006 or more and less than 1. In another example, the maximum height (Fmax) may be about 0.007 or more, about 0.008 or more, about 0.009 or more or about 0.0095 or more, about 0.01 or more, or about 0.015 or more. Also, in another example, the maximum height (Fmax) may be about 0.9 or less, about 0.8 or less, about 0.7 or less, about 0.6 or less, about 0.5 or less, about 0.4 or less, about 0.3 or less, about 0.2 or less, about 0.1 or less, about 0.09 or less, about 0.08 or less, about 0.07 or less, about 0.06 or less, about 0.05 or less, about 0.04 or less, about 0.03 or less, or about 0.02 or less.

When an optical device has been implemented by disposing a plurality of spacers to have the spacing normal distribution diagram in such a form, the uniform optical characteristics can be ensured without causing the so-called moire phenomenon, while the spacers maintain the uniform pitch (cell gap) between the substrates.

When the plurality of spacers has such an irregular arrangement, the concept of degree of irregularity is introduced to define it. Hereinafter, a method for designing the arrangement of the spacers having such a form will be described.

Figure 7:
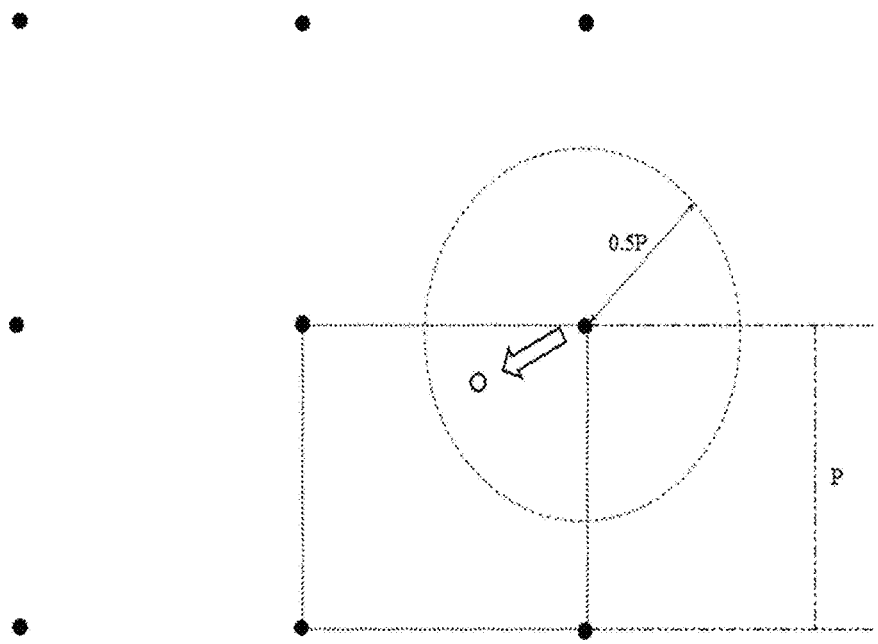

In order to achieve the above-mentioned arrangement of spacers, a step of starting from a normal arrangement state and relocating the spacers to have irregularity is performed. Here, the normal arrangement state is a regular arrangement state as described above, which is a state where the plurality of spacers are disposed on the base layer such that a regular triangle, a square or a regular hexagon in which all sides have the same length can be formed. FIG. 7 is a state in which spacers are disposed to form the square as an example. The length P of one side of the square in this state may be equal to the above-mentioned normal pitch. In such an arrangement state, a circle region having a radius of a length proportional to the length P of one side is designated on the basis of a point where one spacer exists, and the program is set so that the one spacer can be randomly moved in the region. For example, FIG. 4 schematically shows a form in which the circle region having the radius of the length of 50% (0.5P) relative to the length P is set and the spacer moves to any point in the region. The above-described arrangement can be achieved by applying such a movement to spacers of at least 80% or more, 85% or more, 90% or more, 95% or more, or 100% (all spacers).

In such a design method, the ratio for the length P which becomes the radius of the circle region may be defined as a degree of irregularity. For example, in the case shown in FIG. 7, the degree of irregularity is about 50%.

In one example, the degree of irregularity in the design manner may be about 5% or more, about 10% or more, about 15% or more, about 20% or more, about 25% or more, about 30% or more, about 35% or more, about 40% or more, about 45% or more, about 50% or more, about 55% or more, about 60% or more, or about 65% or more. In one example, the degree of irregularity may be about 95% or less, about 90% or less, about 85% or less, or about 80% or less.

The above-described arrangement can be achieved by designing the arrangement of the spacers in the same manner as above and forming the spacers according to the designed arrangement.

Here, although the case where the normal state starts from the square has been exemplified, the normal state may be other figures such as a regular triangle or a regular hexagon, and in this case, the above-described arrangement can also be achieved.

The means for designing the arrangement of the spacers in the same manner as above is not particularly limited, and a known random number coordinate program such as, for example, a CAD, MATLAB, STELLA or Excel random number coordinate program can be used.

For example, after the arrangement of the spacers is first designed in the same manner as above, a mask having a pattern according to the relevant design and the like may be manufactured, and such spacers may be implemented using the relevant mask.

The substrate of the present application may comprise, in addition to the base layer and the spacers, other elements required for driving the optical device. These elements are variously known, and typically, there is an electrode layer or the like. In one example, the substrate may further comprise an electrode layer (300) between the base layer (100) and the spacers (201, 202), as shown in FIG. 2. As the electrode layer, a known material can be applied. For example, the electrode layer may comprise a metal alloy, an electrically conductive compound or a mixture of two or more thereof. Such a material can be exemplified by a metal such as gold, CuI, an oxide material such as ITO (indium tin oxide), IZO (indium zinc oxide), ZTO (zinc tin oxide), zinc oxide doped with aluminum or indium, magnesium indium oxide, nickel tungsten oxide, ZnO, $SnO_2$ or $In_2O_3$, a metal nitride such as gallium nitride, a metal selenide such as zinc selenide, a metal sulfide such as zinc sulfide, or the like. A transparent positive hole injecting electrode layer can also be formed by using a laminate of a metal thin film of Au, Ag or Cu, and the like, and a transparent material having high refractive index such as ZnS, $TiO_2$ or ITO.

The electrode layer may be formed by any means such as vapor deposition, sputtering, chemical vapor deposition or electrochemical means. Patterning of the electrode layer is also possible in a known manner without any particular limitation, and the electrode layer may be patterned, for example, through known photolithography or a process using a shadow mask or the like.

The substrate of the present application may further comprise an alignment film present on the base layer and the spacers.

Thus, another exemplary substrate of the present application may comprise a base layer; spacers present on the base layer; and an alignment film formed on the base layer and the spacers.

Here, the details of the base layer and the spacer are as described above.

The kind of the alignment film formed on the base layer and the spacers is not particularly limited, where a known alignment film, for example, a known rubbing alignment film or a photo-alignment film can be applied.

A method of forming the alignment film on the base layer and the spacers and performing orientation treatment thereon also follows a known method.

The spacer of the present application exhibits excellent adhesion to the base layer or an element (for example, the electrode layer) of the base layer that the spacer contacts.

For example, even if a pressure-sensitive adhesive tape having peel force in a level of about 3.72N/10 mm to 4.16N/10 mm is attached to the surface of the base layer on which the spacers are formed and the adhesive tape is peeled off, the pattern of the spacers can be maintained substantially without being lost. At this time, the pressure-sensitive adhesive tape may be, for example, a tape known as Nichiban tape CT-24. The Nichiban tape has the peel force in a level of about 3.72N/10 mm to 4.16N/10 mm as measured at a peel angle of 180 degrees in accordance with JIS Z 1522 standard. The loss rate of the spacers measured by attaching the Nichiban tape CT-24 to the surface of the base layer, on which the spacers are formed, with a rectangular attachment area of 24 mm in width and 40 mm in length and then peeling the Nichiban tape CT-24 in the longitudinal direction at a peel rate of about 30 mm/s and a peel angle of about 180 degrees may be 15% or less, 13% or less, 11% or less, 9% or less, 8% or less, 7% or less, 6% or less, 5% or less, 4% or less, 3% or less, 2% or less, 1% or less, or 0.5% or less. Here, the loss rate may be a percentage of the number of spacers that have been lost after peeling the pressure-sensitive adhesive tape off relative to the number of all the spacers existing within the attachment area. Depending on the applied use, usually 10,000 to 40,000 spacers may be present in the above attachment area, where the ratio of the spacers to be lost among these spacers may be maintained in the above range.

In the case of the black spacer, in order to satisfy the above-mentioned optical density, a darkening material such as a dye or a pigment is included, where the curing rate of the spacer material is inhibited due to such a darkening material, so that it is very difficult to form a spacer having excellent adhesion as above. However, in the present application, even when the black spacer is applied, it is possible to secure the excellent adhesiveness as described above.

When the spacers exhibit this adhesiveness, the spacers can be stably maintained even in the case where an alignment film is formed on the surface of the spacers and the orientation treatment such as rubbing is performed, so that it is possible to finally manufacture a product having excellent performance. In addition, the substrate on which the spacers are formed can be maintained in a state where a protective pressure-sensitive adhesive film is attached to the surface on which the spacers are formed until it is applied to an actual product, where in such a structure, the pattern can be stably maintained without being lost even when the pressure-sensitive adhesive film is peeled off.

In one example, the substrate may comprise a protective film as an additional configuration. For example, the substrate may further comprise a protective pressure-sensitive adhesive film attached to the surface of the base layer where the spacers are formed. As the pressure-sensitive adhesive film in the above configuration, a known protective pressure-sensitive adhesive film can be used without any particular limitation.

The present application also relates to a method for producing the substrate. The production method may comprise a step of irradiating a layer of a curable composition for column spacers formed on the base layer with light in a state where a light shielding mask is in close contact therewith. In this case, the curable composition may comprise a binder and ball spacers. Here, the binder means a material for forming the aforementioned column spacers. Thus, by applying the layer of the curable composition that the binder and the ball spacers are blended, the light can be irradiated in the state where the light shielding mask is in close contact therewith, whereby the desired column spacers can be formed. In this case, the details of the binder and the ball spacer are as described above.

Therefore, the binder is a conventional binder used for producing column spacers or the like, where one comprising an ultraviolet curable compound of acrylate series or epoxy series and an initiator may be used, and at this time, the binder may also comprise other components such as a dispersant as necessary.

As the ball spacer, one having the standard deviation of the above-described particle diameter while having an average particle diameter satisfying the height average value and the diameter average value of the desired column spacers and the above-described ratio can be used.

The production method is a method for producing column spacers which comprises a step of irradiating the layer of the curable composition for column spacers formed on the base layer with light in a state where a light shielding mask is in close contact therewith, where the curable composition may comprise a binder and ball spacers. In addition, the ratio (H/D) of the average value (H) of the heights of the formed column spacers to the average particle diameter (D) of the ball spacers may be more than 1. On the other hand, the ratio (T/D) of the average value (T) of the diameters of the column spacers to the average particle diameter (D) of the ball spacers may be more than 1.

As described above, the ratio (H/D) may also be 1.2 or less or so, 1.1 or less or so, 1.09 or less or so, 1.08 or less or so, 1.07 or less or so, 1.06 or less or so, 1.05 or less or so, 1.04 or less or so, 1.03 or less or so, 1.02 or less or so, or 1.01 or less or so.

As described above, in another example, the ratio (T/D) may be 1.2 or more or so, 1.4 or more or so, 1.6 or more or so, 1.8 or more or so, 2 or more or so, 2.2 or more or so, 2.4 or more or so, or 2.6 or more or so, or may also be 5 or less or so, 4.8 or less or so, 4.6 or less or so, 4.4 or less or so, 4.2 or less or so, 4 or less or so, 3.8 or less or so, 3.6 or less or so, 3.4 or less or so, 3.2 or less or so, 3 or less or so, 2.8 or less or so, 2.6 or less or so, 2.4 or less or so, or 2.2 or less or so.

The ball spacer may have a particle diameter standard deviation of 0.8 μm or less. In another example, the standard deviation may be 0.7 μm or less or so, 0.6 μm or less or so, or 0.5 μm or less or so, or may be 0 μm or more or so, more than 0 μm or so, 0.1 μm or more or so, 0.2 μm or more or so, 0.3 μm or more or so, or 0.4 μm or more or so. By applying such ball spacers, spacers of the desired shape can be effectively formed.

As described above, the ball spacers may have a particle diameter CV (coefficient of variation) value (=100×standard deviation of ball spacer particle diameters/average particle diameter of ball spacers) of 8% or less or so, 7% or less or so, 6% or less or so, or 5% or less or so, or may also be 0% or more or so, more than 0% or so, 1% or more or so, 2% or more or so, 3% or more or so, or 4% or more or so.

Here, the curable composition may comprise more than 1 part by weight of the ball spacers relative to 100 parts by weight of the above-described binder. In another example, the ratio may be about 1.1 parts by weight or more, about 1.2 parts by weight or more, about 1.3 parts by weight or more, about 1.4 parts by weight or more, or 1.5 parts by weight or more, or may be about 10 parts by weight or less, about 9 parts by weight or less, about 8 parts by weight or less, about 7 parts by weight or less, about 6 parts by weight or less, or about 5.5 parts by weight or less.

By blending the ball spacers under this ratio, the desired spacer structure can be effectively formed. Also, here, the weight of the binder used as a reference of the weight ratio of the ball spacers is the weight of the components except for the ball spacers contained in the curable composition.

When the black spacers are formed, the curable composition may further comprise the above-described darkening material, where the ball spacer may also be a black ball spacer.

Figure 8:
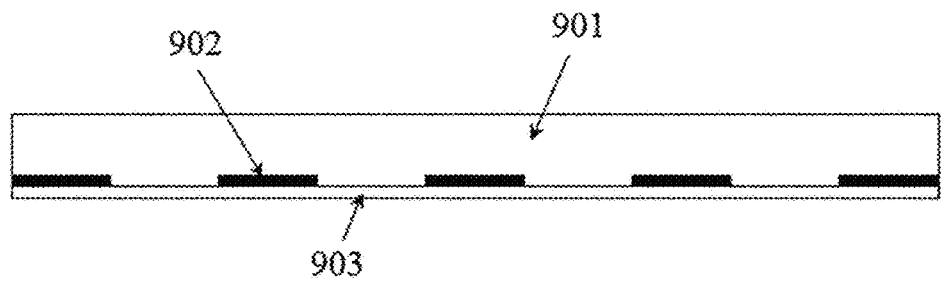
FIG. 8 is a schematic diagram of a light shielding mask applied in the production method of the present application.

As the light shielding mask applied in the above process, a general mask may be applied. For example, as shown in FIG. 8, in this light shielding mask, a pattern of a light shielding layer (902) is formed on one surface of a light transmissive body (901), where a release layer (903) may be formed on the surface of the light shielding layer (902) and the body (901).

Here, the light shielding layer (902) may be formed in a predetermined pattern on the body (901), and the shape of such a pattern may be determined in consideration of the shape and/or arrangement of the desired spacers. The light shielding masks having such a form are variously known, and all of these known masks can be applied in the above method.

Figure 9:
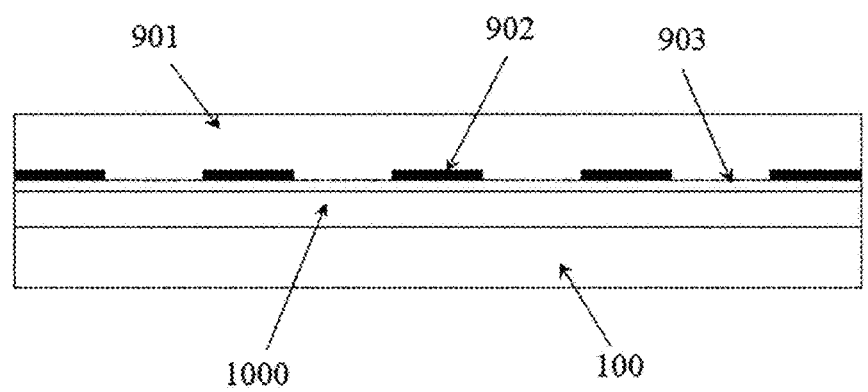
FIG. 9 is a diagram illustratively showing one state of the production process of the substrate of the present application.

As shown in FIG. 9, the curable composition may be cured by irradiating the layer (1000) of the curable composition formed on the base layer (100) with light via the mask in a state where the mask (901, 902 and 903) is in close contact therewith.

Although not illustrated in the drawings, other components such as an electrode layer may be formed between the base layer (100) and the layer (1000) of the curable composition.

At this time, the state of the irradiated light, for example, the wavelength, the light quantity, the intensity, and the like are not specifically limited, which may be determined according to the degree of the desired curing and the kind of the curable composition.

In the production method of the present application, a so-called developing process of removing the uncured curable composition after the light irradiation may be performed, where this manner may be performed in a known manner.

Through this process, the substrate may be produced.

The present application also relates to an optical device formed using such a substrate.

An exemplary optical device of the present application may comprise the substrate and a second substrate disposed opposite to the substrate and maintaining a gap with the substrate by the spacers in the substrate.

In the optical device, a light modulation layer may be present in a gap between two substrates. In the present application, the term light modulation layer may include all known types of layers capable of changing at least one characteristic among characteristics such as polarization states, transmittance, color tones and reflectance of incident light depending on purposes.

For example, the light modulation layer is a layer comprising a liquid crystal material, which may be a liquid crystal layer switched between a diffusion mode and a transparent mode by on-off of a voltage, for example, a vertical electric field or a horizontal electric field, a liquid crystal layer switched between a transparent mode and a blocking mode, a liquid crystal layer switched between a transparent mode and a color mode, or a liquid crystal layer switched between color modes of different colors.

The light modulation layers capable of performing the actions as above, for example, liquid crystal layers, are variously known. As one exemplary light modulation layer, a liquid crystal layer used in a typical liquid crystal display can be used. In another example, the light modulation layer may also be various types of so-called guest host liquid crystal layers, polymer dispersed liquid crystal layers, pixel-isolated liquid crystal layers, suspended particle devices or electrochromic devices, and the like.

The polymer dispersed liquid crystal layer (PDLC) is a superordinate concept including a PILC (pixel isolated liquid crystal), a PDLC (polymer dispersed liquid crystal), a PNLC (polymer network liquid crystal) or a PSLC (polymer stabilized liquid crystal), and the like. The polymer dispersed liquid crystal layer (PDLC) may comprise, for example, a liquid crystal region containing a polymer network and a liquid crystal compound dispersed in a state of being phase-separated from the polymer network.

The implementation manner or form of the light modulation layer is not particularly limited, and any known method may be employed without any limitation depending on purposes.

In addition, the optical device may further comprise additional known functional layers, such as a polarizing layer, a hard coating layer and/or an antireflection layer, if necessary.

Advantageous Effects

The present application can provide a substrate on which spacers having excellent dimensional accuracy and adhesiveness are formed, and a method capable of effectively producing such a substrate.

MODE FOR INVENTION

Hereinafter, the present application will be specifically described by way of examples, but the scope of the present application is not limited by the following examples.

1. Optical Density (OD) Measurement

The optical density described below is a result measured by the following method. In a laminate in which a transparent layer (ITO (indium tin oxide) layer) is formed on a transparent PET (poly(ethylene terephthalate)) base film, the curable compositions for producing column spacers in Examples or Comparative Examples are each applied on the transparent layer, and irradiated with ultraviolet rays (wavelength: about 365 nm, ultraviolet irradiance level: 2,200 to 4,400 mJ/cm$^2$) and cured to form a layer having a thickness of 12 µm or so. In this specification, the thickness is a value measured using an Optical Profiler measuring instrument (manufacturer: Nano System, trade name: Nano View-E1000). Subsequently, the transmittance and the optical density of the formed layer are measured using a measuring device (manufacturer: x-rite, trade name: 341C). The measuring instrument is an instrument that measures the transmittance (unit: %) (T) for light in a wavelength range of visible light (400 to 700 nm) and obtains the optical density (D) through it, where the optical density is obtained for the relevant thickness (12 µm) by substituting the measured transmittance (T) into the equation (optical density (OD)=−log$_{10}$ (T), where T is the transmittance).

2. Measurement of Spacer Height, Diameter and Standard Deviation

The height of the spacer described below was confirmed using a measuring instrument (Optical profiler, Nano System, Nano View-E1000). The diameter of the spacer was confirmed using an optical microscope (Olympus BX 51). The standard deviations for each of the heights and diameters were obtained as the positive square root of variance for each average (the standard deviations were obtained for spacers that exist in an area that the width and the length were each 300 mm, and obtained for approximately 50 to 250 spacers).

Example 1

A curable composition used to form spacers was prepared in the following manner. The composition was prepared by mixing black ball spaces and a darkening material with a binder (including an ultraviolet curable acrylate compound, a polymerization initiator, and a dispersant) commonly used in the production of column spacers. At this time, as the black ball spacers, black ball spacers (manufacturer: Sekisui Chemical, trade name: KBN 5115) having an average particle diameter of 11.5 µm, a CV (coefficient of variation) of 4, and a particle diameter standard deviation of approximately 0.46 µm or so were used. The black ball spacers were blended at about 2.5 parts by weight relative to 100 parts by weight of the binder (total weight of the acrylate compound, the initiator and the dispersant). In addition, as the darkening material, carbon black was blended in the material at a ratio of approximately 3 weight %. As a result of confirming the optical density (OD) of the prepared composition by the above-described method, it was approximately 1.9. In a uniaxially stretched PET (poly(ethylene terephthalate)) base film that an amorphous ITO (indium tin oxide) electrode layer was formed on the surface thereof, about 2 to 3 mL or so of the composition was added in drops on the electrode layer, and the added mixture was pressed with a mask to form a laminate including the base layer, the electrode layer, the curable composition layer and the mask, and irradiated with ultraviolet rays toward the mask in this state to cure the curable composition layer (ultraviolet irradiance level: 19,800 mJ/cm$^2$).

Figure 10:
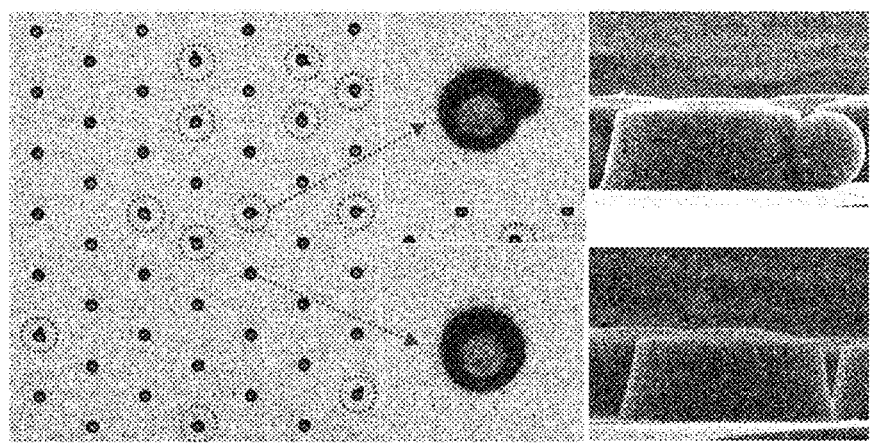
FIGS. 10 to 15 are surface photographs of the substrate on which the spacers produced in Examples 1 to 5 are formed.
Figure 11:
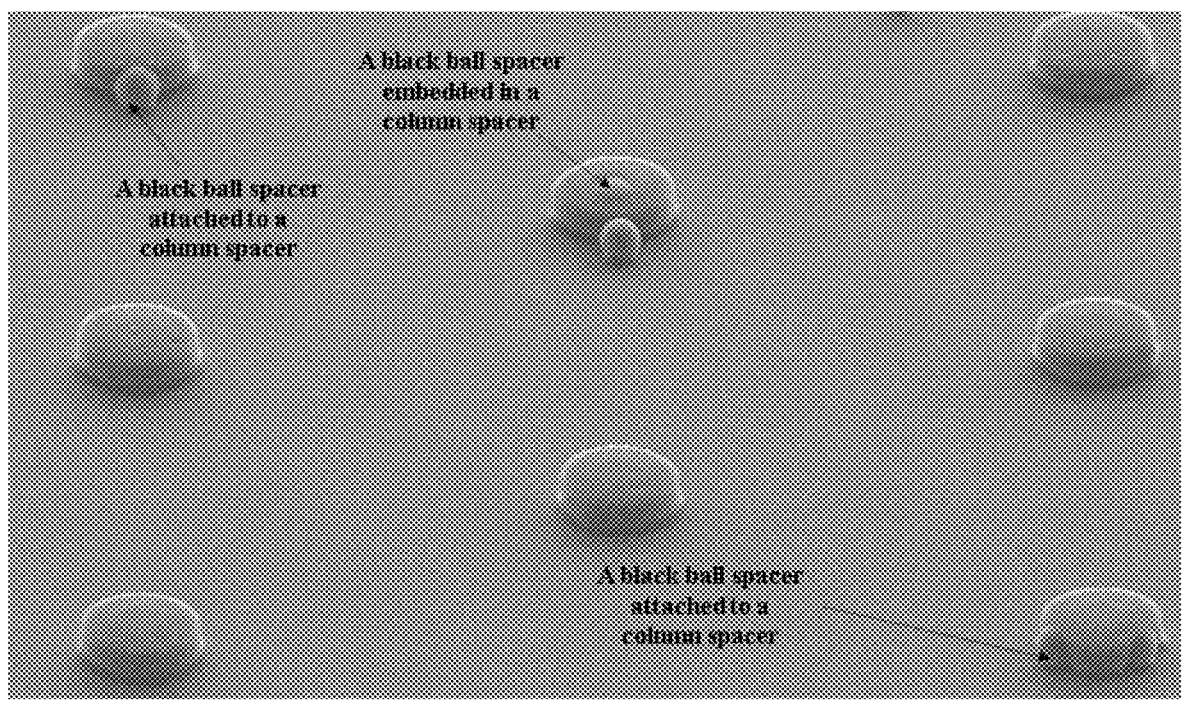

As the mask applied at the time of producing a substrate, as shown in FIG. 8, a mask in a form, in which the patterned light shielding layer (AgX, X=Cl, F, Br or I) (902) and the release layer (903) were formed on a PET (poly(ethylene terephthalate)) film as a transparent base film (body) (901) sequentially, was used. Here, the pattern of the light shielding layer (902) was formed such that regions, in which the circular light shielding layer was not formed (diameter: about 20 µm), were regularly arranged so as to form a closed figure of a triangle that the respective side lengths as mentioned above were substantially the same, where the length (pitch) of each side of the triangle was approximately 150 µm or so. After ultraviolet irradiation, the uncured curable composition was removed (developed) to form spacers. FIGS. 10 and 11 are the surface photographs of the substrate on which spacers produced in such a manner are formed. As shown in the drawings, the spacers comprise column spacers with black ball spacers attached thereto, column spacers with black ball spacers embedded therein, and column spacers without any black ball spacer attached thereto. The ratio (A:B) of the number (A) of column spacers that the black ball spacers were attached thereto and embedded therein to the number (B) of column spacers that the black ball spacers were not attached thereto and embedded therein was approximately 3:5 or so. In addition, the heights of the column spacers were approximately 11.7 µm to 12.3 µm, where the average was about 12 µm or so, and the diameters were approximately 30 µm to 40 µm or so, where the average was about 34 µm or so. Then, the ratio of the area where spacers exist in the surface of the substrate was approximately 3.6% to 7% or so. Here, the height standard deviation of the column spacers was approximately 0.16 µm or so, and the diameter standard deviation was approximately 0.74 µm or so.

Example 2

Figure 12:
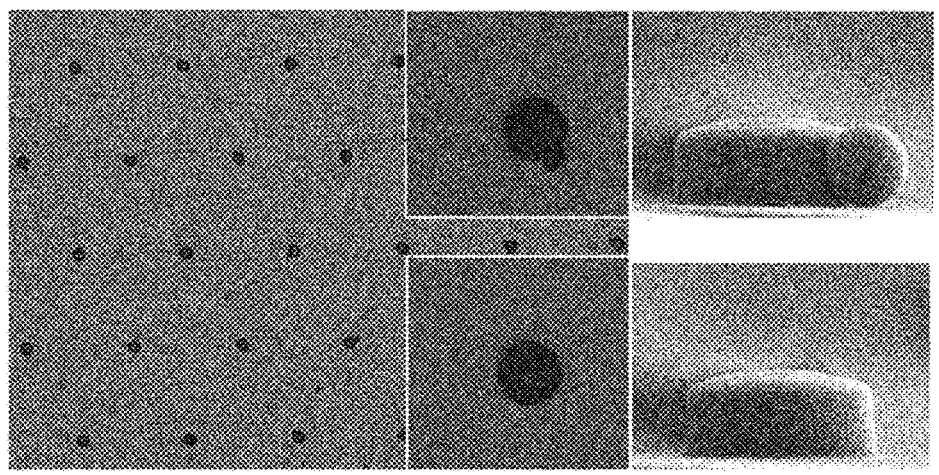

A substrate, on which spacers were formed, was produced in the same manner as in Example 1, except that the diameter of the circular portion where the light shielding layer was not formed in the mask was approximately 20 µm or so, and the interval of the circular portions was changed to be 250 µm or so. FIG. 12 is the surface photograph of the substrate on which spacers produced in the above manner are formed. As shown in the drawing, the spacers comprise column spacers with black ball spacers attached thereto and/or embedded therein, and column spacers without any black ball spacer attached thereto. The ratio (A:B) of the number (A) of column spacers that the black ball spacers were attached thereto and embedded therein to the number (B) of column spacers that the black ball spacers were not attached thereto and embedded therein was approximately 7:18 or so. In addition, the heights of the column spacers were approximately 11.9 µm to 12.3 µm or so, where the average was about 12.1 µm or so, and the diameters were approximately 27 µm to 32 µm or so, where the average was about 30 µm or so. Then, the ratio of the area where spacers exist in the surface of the substrate was approximately 1% to 2% or so. Here, the height standard deviation of the column spacers was approximately 0.15 µm or so, and the diameter standard deviation was approximately 0.75 µm or so.

Example 3

Figure 13:
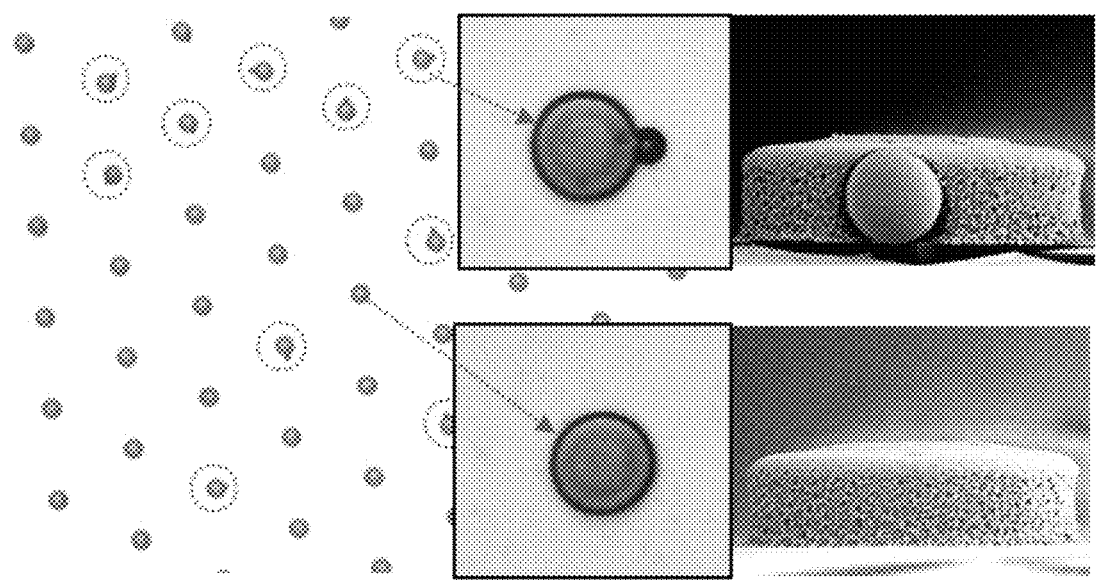

A substrate, on which spacers were formed, was produced in the same manner as in Example 1, except that the ratio of carbon black was adjusted to be about 2 weight % at the time of preparing the curable composition, whereby the optical density of the cured layer was approximately 1.3 or so. FIG. 13 is the surface photograph of the substrate on which spacers produced in the above manner are formed. As shown in the drawing, the spacers comprise column spacers with black ball spacers attached thereto and/or embedded therein, and column spacers without any black ball spacer attached thereto and embedded therein. The ratio (A:B) of the number (A) of column spacers that the black ball spacers were attached thereto and embedded therein to the number (B) of column spacers that the black ball spacers were not attached thereto and embedded therein was approximately 7:18 or so. In addition, the heights of the column spacers were approximately 11.7 µm to 12.3 µm or so, where the average was about 12 µm or so, and the diameters were approximately 33 µm to 40 µm or so, where the average was about 36 µm or so. Then, the ratio of the area where spacers exist in the surface of the substrate was approximately 4.4% to 7% or so. Here, the height standard deviation of the column spacers was approximately 0.12 µm or so, and the diameter standard deviation was approximately 0.8 µm or so.

Example 4

Figure 14:
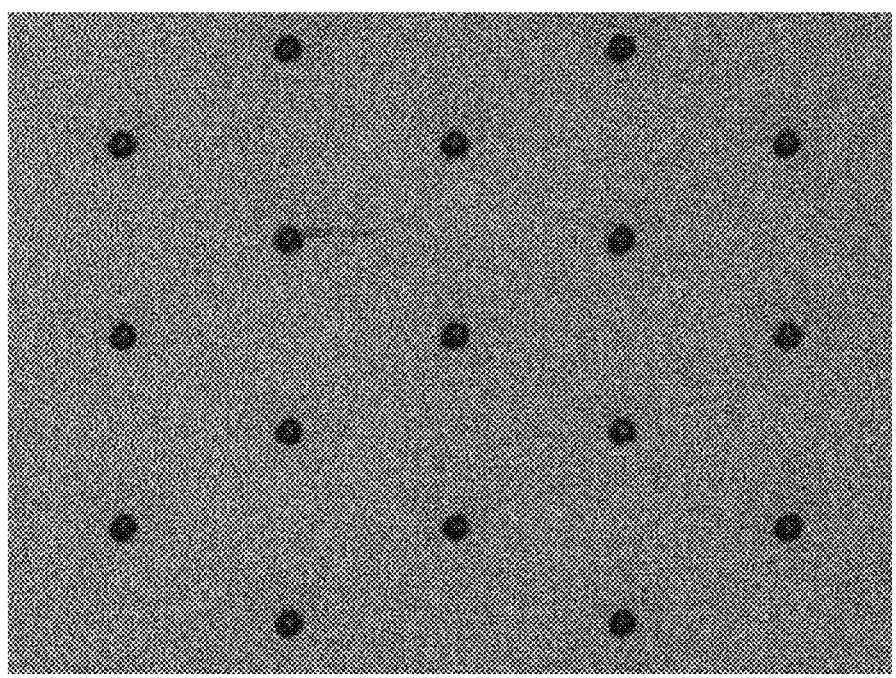

A substrate was produced in the same manner as in Example 1, except for using the curable composition prepared by blending the black ball spacers at about 1.5 parts by weight relative to 100 parts by weight of the binder weight (total weight of the acrylate compound, initiator and dispersant, etc.) at the time of preparing the curable composition. FIG. 14 is the surface photograph of the substrate on which spacers produced in the above manner are formed. As shown in the drawing, the spacers comprise column spacers with black ball spacers attached thereto and/or embedded therein, and column spacers without any black ball spacer attached thereto and embedded therein. The ratio (A:B) of the number (A) of column spacers that the black ball spacers were attached thereto and embedded therein to the number (B) of column spacers that the black ball spacers were not attached thereto and embedded therein was approximately 19:81 or so. In addition, the heights of the column spacers were approximately 11.8 µm to 12.2 µm or so, where the average was about 12.1 µm or so, and the diameters were approximately 30 µm to 33 µm or so, where the average was about 32 µm or so. Then, the ratio of the area where spacers exist in the surface of the substrate was approximately 3.5% to 4.5% or so. Here, the height standard deviation of the column spacers was approximately 0.13 µm or so, and the diameter standard deviation was approximately 0.46 µm or so.

Example 5

Figure 15:
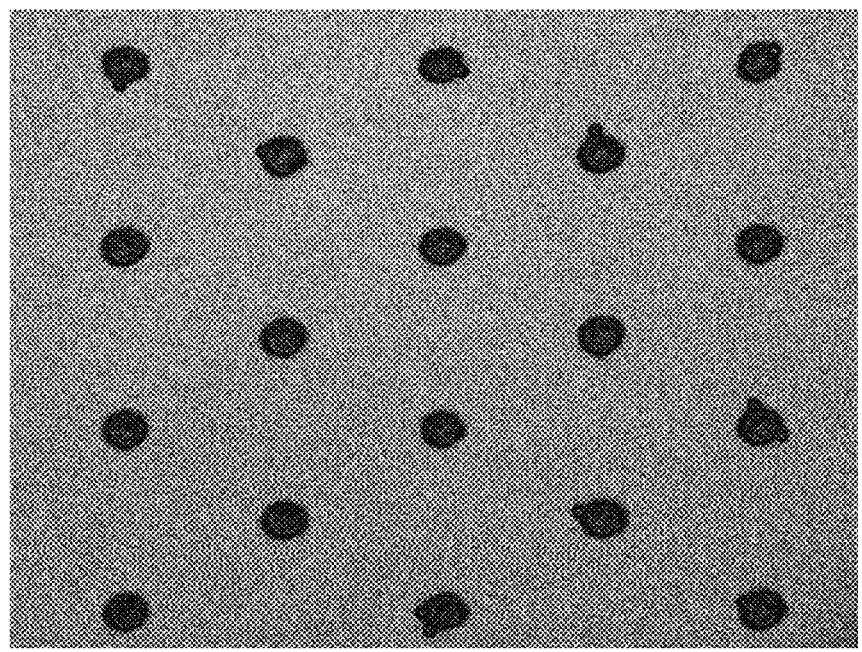
Figure 16:
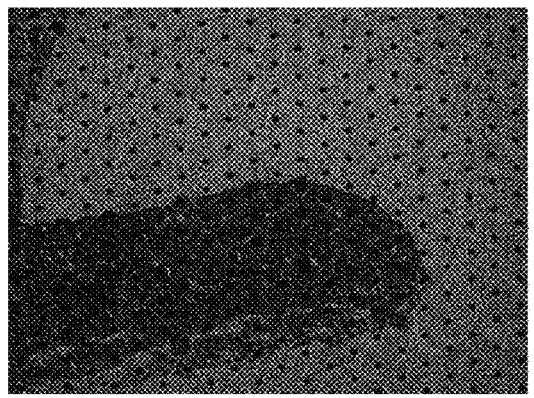
FIGS. 16 to 20 are photographs after performing the adhesiveness test of the spacers on the substrates of Examples 1 to 5, respectively.
Figure 17:
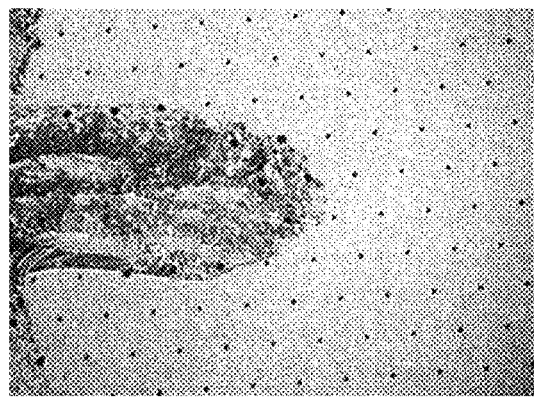
Figure 18:
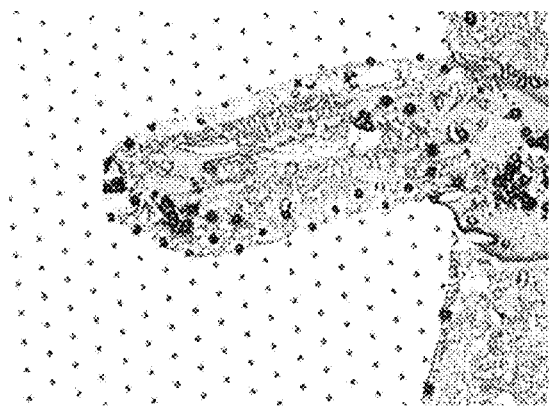
Figure 19:
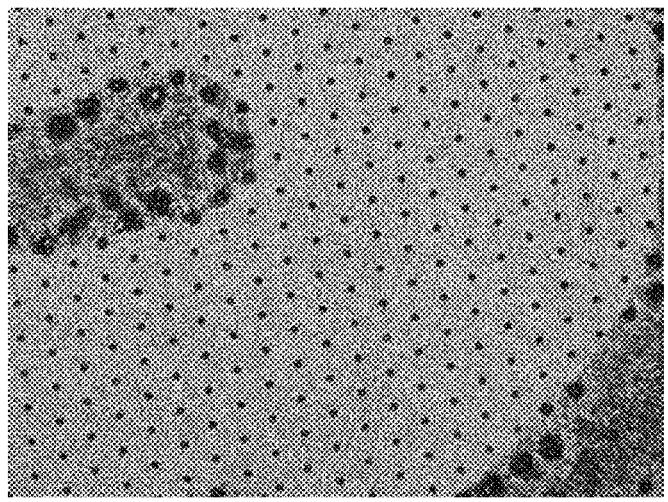
Figure 20:
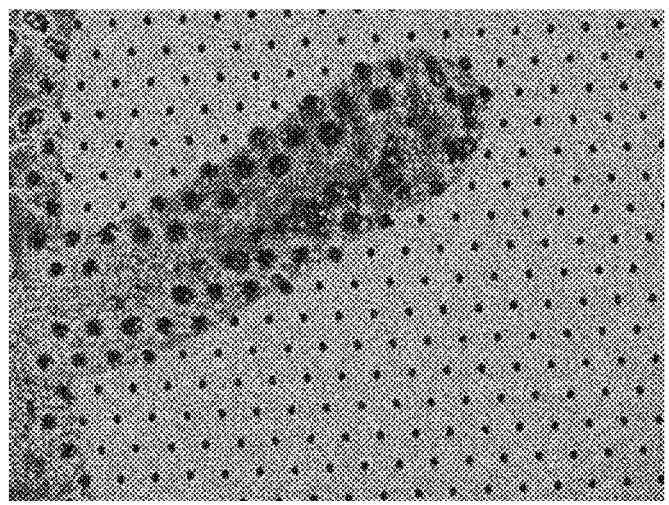

A substrate was produced in the same manner as in Example 1, except for using the curable composition prepared by blending the black ball spacers at about 5 parts by weight relative to 100 parts by weight of the binder weight (total weight of the acrylate compound, initiator and dispersant, etc.) at the time of preparing the curable composition. FIG. 15 is the surface photograph of the substrate on which spacers produced in such a manner are formed. As shown in the drawing, the spacers comprise column spacers with black ball spacers attached thereto and/or embedded therein, and column spacers without any black ball spacer attached thereto and embedded therein. The ratio (A:B) of the number (A) of column spacers that the black ball spacers were attached thereto and embedded therein to the number (B) of column spacers that the black ball spacers were not attached thereto and embedded therein was approximately 61:39 or so. In addition, the heights of the column spacers were approximately 11.8 µm to 12.5 µm or so, where the average was about 12.3 µm or so, and the diameters were approximately 34 µm to 37 µm or so, where the average was about 32 µm or so. Then, the ratio of the area where spacers exist in the surface of the substrate was approximately 4.5% to 5.5% or so. Here, the height standard deviation of the column spacers was approximately 0.2 µm or so, and the diameter standard deviation was approximately 0.86 µm or so.

Test Example 1. Adhesion Evaluation

A pressure-sensitive adhesive tape (Nichiban tape, CT-24) (peel force: 3.72 to 4.16 N/10 mm, peel angle: 180 degrees, JIS Z 1522 standard) was attached to the surfaces of the substrates produced in Examples, on which the black column spacers were formed, with a rectangular attachment area of approximately 24 mm in width and approximately 40 mm in length. At the time of the attachment, the pressure-sensitive adhesive tape was attached by applying a load of about 200 g thereon using a roller. Thereafter, the pressure-sensitive adhesive tape was peeled off in the longitudinal direction using a tensile tester at a peel rate of about 30 mm/s and a peel angle of 180 degrees. FIGS. 16 to 20 are the results after performing the evaluation as above on the substrates of Examples 1 to 5, respectively. As a result of the evaluation, in Examples 1, 2, 4, and 5, the loss of the spacer hardly occurred, so that the loss rate was substantially 0%, and in the case of Example 3, only a minute loss was confirmed (loss rate of Example 3: about 7%).

The invention claimed is:

1. A substrate, comprising: a base layer; a plurality of column spacers disposed on the base layer; and a plurality of ball spacers, wherein at least one of the plurality of ball spacers is attached to or embedded in at least one of the plurality of column spacers, wherein a ratio (A/B) of a number (A) of the plurality of column spacers to which a ball spacer of the plurality of ball spacers is attached or in which the a ball spacer of the plurality of ball spacers is embedded relative to a number (B) of column spacers of the plurality of column spacers to or in which a ball spacer of the plurality of ball spacers is not attached or embedded is in a range from 0.01 to 10.

2. The substrate according to claim 1, wherein an optical density of each of the plurality of column spacers is in a range from 1.1 to 4.

3. The substrate according to claim 1, wherein each of the plurality of column spacers comprise a pigment or a dye.

4. The substrate according to claim 1, wherein each of the plurality of column spacers comprise a metal oxide, a metal nitride, a metal oxynitride, carbon black, graphite, an azo-based pigment, a phthalocyanine pigment or a carbon-based material.

5. The substrate according to claim 1, wherein the base layer is an inorganic base layer or an organic base layer.

6. The substrate according to claim 1, further comprising:
an electrode layer disposed between the base layer and the plurality of column spacers,
wherein the plurality of column spacers are in contact with the electrode layer.

7. The substrate according to claim 1, wherein an average height of the plurality of column spacers is in a range from 2 μm to 50 μm.

8. The substrate according to claim 1, wherein a standard deviation in heights of the plurality of column spacers is in a range from 0.05 μm to 0.3 μm.

9. The substrate according to claim 1, wherein an average diameter of the plurality of column spacers is in a range from 4 μm to 60 μm.

10. The substrate according to claim 1, wherein a standard deviation in diameters of the plurality of column spacers is in a range from 0.3 μm to 1.5 μm.

11. The substrate according to claim 1, wherein a ratio (T/D) of an average (T) of diameters of the plurality of column spacers relative to an average diameter (D) of the plurality of ball spacers is more than 1.

12. The substrate according to claim 1, wherein a standard deviation in a diameter of the plurality of ball spacers is 0.8 μm or less.

13. The substrate according to claim 1, wherein an area of the plurality of column spacers and the plurality of ball spacers is in a range from 0.5% to 20% based on an area of the total surface of the base layer.

14. The substrate according to claim 1 further comprising: a protective pressure-sensitive adhesive film attached on a surface of the base layer on with the plurality of column spacers and the plurality of ball spacers are formed.

15. A method for producing the substrate of claim 1, comprising: irradiating a layer of a curable composition on the base layer with light through a light shielding mask, wherein the layer of curable composition comprises the plurality of ball spacers and a binder; and removing uncured portions of the curable composition to form the plurality of column spacers.

16. The method for producing the substrate according to claim 15, wherein the curable composition comprises more than 1 part by weight of the plurality of ball spacers relative to 100 parts by weight of the binder.

17. An optical device comprising: the substrate of claim 1; and a second substrate disposed opposite to the substrate of claim 1, wherein a gap between the substrates is maintained by the plurality of column spacers and the plurality of ball spacers.

* * * * *